United States Patent
Vadassery et al.

(10) Patent No.: US 9,668,270 B2
(45) Date of Patent: May 30, 2017

(54) SYSTEM AND METHOD FOR SETTING WIRELESS MESSAGE PRIORITY

(71) Applicant: Avaya Inc., Basking Ridge, NJ (US)

(72) Inventors: Prasad Vadassery, Dracut, MA (US); Shu Ching Shieh, Nashua, NH (US); Seemant Choudhary, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 431 days.

(21) Appl. No.: 13/622,208

(22) Filed: Sep. 18, 2012

(65) Prior Publication Data

US 2014/0082114 A1    Mar. 20, 2014

(51) Int. Cl.
  *H04W 72/10* (2009.01)
  *H04W 4/00* (2009.01)
  *H04W 12/12* (2009.01)

(52) U.S. Cl.
  CPC .............. *H04W 72/10* (2013.01); *H04W 4/00* (2013.01); *H04W 12/12* (2013.01)

(58) Field of Classification Search
  CPC .......... G06F 15/16; H04W 8/00; H04W 72/10
  See application file for complete search history.

(56) References Cited

U.S. PATENT DOCUMENTS

| | | | | |
|---|---|---|---|---|
| 7,321,556 | B1 * | 1/2008 | Parekh et al. | 370/232 |
| 8,850,521 | B2 * | 9/2014 | Khalid et al. | 726/3 |
| 2006/0085797 | A1 * | 4/2006 | Connelly | G06F 9/546 |
| | | | | 719/314 |
| 2007/0002736 | A1 * | 1/2007 | Gade | H04W 12/12 |
| | | | | 370/230 |
| 2007/0156919 | A1 * | 7/2007 | Potti et al. | 709/238 |
| 2012/0079052 | A1 * | 3/2012 | Lutz et al. | 709/207 |
| 2012/0149405 | A1 * | 6/2012 | Bhat | 455/466 |
| 2013/0060966 | A1 * | 3/2013 | Moisiadis et al. | 709/250 |
| 2013/0259057 | A1 * | 10/2013 | Dutta | 370/401 |
| 2014/0082114 | A1 * | 3/2014 | Vadassery | H04W 4/00 |
| | | | | 709/207 |

OTHER PUBLICATIONS

Cisco Catalyst 3750 QoS Configuration Examples, May 17, 2007, Cisco Systems Inc.*
Cisco Wireless ISR and HWIC Access Point Configuration Guide, Dec. 2006, Cisco Systems Inc.*
Cisco, "Quality of Service Design Overview", 2005, Chapter 1.*

\* cited by examiner

*Primary Examiner* — Jerry Dennison

(57) ABSTRACT

A wireless access point employs monitor to scrutinize priority of mobility unit assigned priority values, and replaces invalid or reserved values to prevent rogue or poorly constructed applications (apps) from improper priority specification and subsequent imbalance of priority message transmission for control and other high-priority message traffic. The access point receives an indication of reserved message priorities from a wireless switching point at a remote end of an access tunnel providing backhaul network access to mobility units coupled to the access point. The access point stores the reserved message priorities for comparison with priorities assigned at the mobility units. Messages having invalid priorities are modified to reduce the priority to an allowed value, such as best effort, prior to the message transmission through the access tunnel to the backhaul network.

18 Claims, 5 Drawing Sheets

SYSTEM AND METHOD FOR SETTING WIRELESS MESSAGE PRIORITY

BACKGROUND

Wireless hand-held communication devices, typically referred to as mobility devices, are gaining popularity as the capabilities of such portable devices continues to increase. Modern mobility devices provide computing power that was formerly available only on a stationary desktop unit. These mobility devices, in addition to cellular phone and browser capability, allow execution of an increasing assortment of applications, or "apps," for performing various business, organizational and entertainment tasks. These apps include both vendor supplied and third-party apps developed from a variety of sources. Many users employ and launch a variety of such apps, and additional apps become available as various commercial entities distribute apps to complement their main line business.

SUMMARY

An access point monitor scrutinizes priority of mobility unit assigned priority values, and replaces invalid or reserved values to prevent rogue or poorly constructed applications (apps) from improper priority specification and subsequent imbalance of priority message transmission for control and other high-priority message traffic. The method to protect the high priority control traffic from a malicious or erroneous wireless client on the trusted access tunnel prevents unauthorized QoS or other priority values on access tunnel messages from the wireless access point. The access point receives an indication of reserved message priorities from a wireless switching point at a remote end of an access tunnel providing backhaul network access to mobility units coupled to the access point. The access point stores the reserved message priorities for comparison with priorities assigned at the mobility units. Messages having invalid priorities are modified to reduce the priority to an allowed value, such as best effort, prior to the message transmission through the access tunnel to the backhaul network.

On the wireless domain, the Access Tunnel (AT) connection is established between an Access Point and a Wireless Switch Point (WSP). The establishment of the AT between an AP and WSP can depend on current load on WSP, reachability of WSP from the AP, . . . , etc. Due to the dynamic nature of assignment of an AP to a WSP, the AP might establish connection with one WSP (WSP-A) at one time, and then with another WSP (WSP-B) at another time. The WSP's might belong to different QoS domain or have different QoS configuration on the physical ports. The AT end-point on WSP is treated as a Layer-3 trusted port by the WSP, so that the QoS setting on the traffic received from the AT is always granted. However, this leaves the wireless domain open for attacking by the malicious wireless client sending high priority traffic to paralyze the control activity.

Configurations herein are based, in part, on the observation that widespread availability of mobility applications (apps) for personal electronic devices such as iPhones®, Windows® phones and similar wireless telecommunication and computing devices opens the possibility of improper or unscrupulous usage of message priority fields typically reserved for QoS based or system level messages. Certain trust levels are often afforded over wireless links, such as those between a wireless access point and the mobility devices to support applications such as voice and video that require QoS guarantees on wireless link as well as the AP back-end wired distribution system. Unfortunately, conventional arrangements suffer from the shortcoming that an erroneous, unauthorized or improper priority value assigned by an app may propagate through subsequent encapsulation and tunneling operations. As enterprises allow users flexibility to bring any device into the wireless network, there is no control on the nature of applications installed on the wireless device and the risk to the network due to misbehaving applications increases. Encapsulation operations, such as those employed by an access tunnel, typically append the priority value from an encapsulated layer to the outermost (encapsulating) layer or header. An initially improper priority value may therefore propagate through encapsulation mechanisms and be taken as a valid priority by access tunnels and other transport mechanisms that look to the priority.

Accordingly, configurations herein substantially overcome the above described shortcomings by employing a reserved priority setting or list, and propagating the reserved priorities from a wireless switching point to the remote wireless access point receiving the app-generated messages from the mobility devices. The access point compares the priority values assigned by the mobility apps prior to encapsulation and transport through an access tunnel to the wireless switching point. In this manner, erroneous, improper and/or unscrupulous priority values are detected at the access point before further network propagation.

Presently available QoS implementation provides either trusted port or non-trusted port configuration to grant/deny the QoS setting of the traffic. However, this method may not correct the QoS setting on the traffic sourced from the wireless clients if the traffic carries the QoS setting reserved for networking control traffic.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following descrip

DETAILED DESCRIPTION

Depicted below is an example arrangement for invoking the disclosed method to correct the QoS setting sourced from the wireless client, in which the WSP sends, to the Access Point, a QoS configuration of the physical port mapped to the Access Tunnel. A MA (Mobility Agent) protocol between AP and WSP is extended to include this new message. The message would be sent to AP as soon as the AT is established. The message will also be sent from WSP to AP as soon as the AT to physical port mapping is changed on the WSP.

Upon receiving the QoS MA message, the AP would records the new QoS values as the network QoS setting. Whenever the traffic is received from the wireless client, the QoS value set by the wireless client on the traffic would be checked against the set of network (reserved) priorities. If the traffic carries the QoS matched to the specified network (i.e. reserved) QoS setting, the QoS value will be remarked to best effort or other non-interfering priority value before it is encapsulated and forwarded to WSP.

Figure 1:
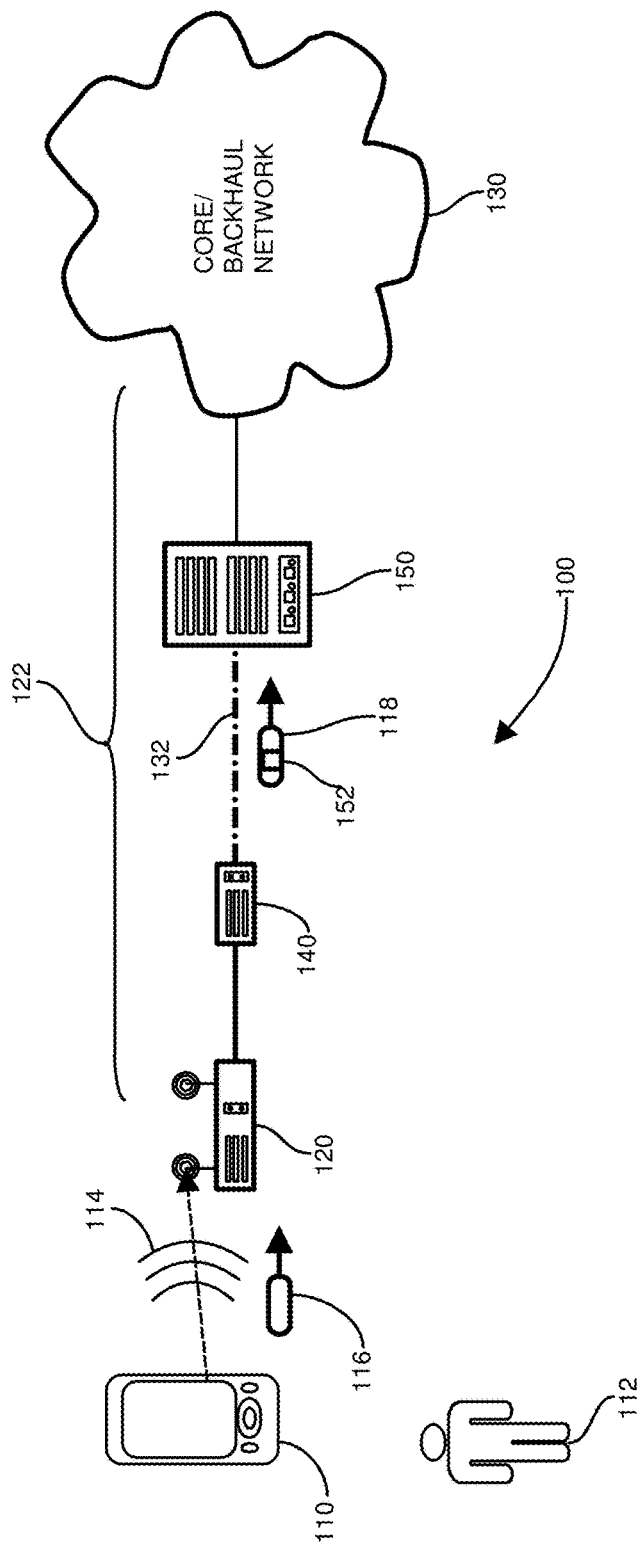
- FIG. 1 is a context diagram of a wireless environment suitable for use with configurations herein.

FIG. 1 is a context diagram of a wireless environment suitable for use with configurations herein. Referring to FIG. 1, in the wireless environment 100 a mobility unit 110 such as a cellphone or smartphone is responsive to a user 112 for wireless communication via signals 114 sent between a wireless access point 120 and the mobility unit 110. The wireless access point 120 typically serves a plurality of users under a wireless protocol such as that promulgated by IEEE 802.11, and employs a connection 122 to a wireless switching point 150 for access to a core or backhaul network 130 via an access tunnel 132 and one or more switching devices 140.

In operation, wireless messages 118 defining message traffic between the network 130 and the mobility device 110 employ a priority setting 152 indicative of the relative transmission priority (i.e. ordering) that the message 118 should receive relative to other message traffic. Such priorities are often according to an established policy or QoS (Quality of Service) scheme which dictates an ordering of messages based on the type of traffic. For example, email messages generally do not require real time treatment, while voice conversations will be received garbled if a regular stream of voice data is not received in a timely manner.

In the wireless environment 100, traffic through the access tunnel (AT) is encapsulated. Encapsulation typically carries the priority through to outer encapsulated layers, hence the unencapsulated packet 116 received from the mobility device 110 drives the priority. However, the access point 120 has no control over mobility applications 111 setting the priority on the message 116 sent from the mobility device. Accordingly, an improperly or overly generous priority setting 152 applied by a mobility application carries through to the access tunnel 132 encapsulation and affords the message packet 118 a higher priority as set by the mobility device 110. Therefore, it may be possible for a poorly or unscrupulously defined mobility application to generate higher priority traffic to favor certain messages and effectively bypass the QoS policy in effect. The resulting excess of high priority messages may imbalance the QoS expectations of the message volume and cause certain QoS guidelines to fail to be met. Therefore, the access point 120 checks the priority on the incoming message, and if it is a restricted, disallowed, or excessively high priority that should not have been set by applications on the mobility device 110, the access point 120 overwrites the priority 152 with a default priority, typically a "best effort" delivery mode usually employed for lower priority message traffic.

Figure 2:
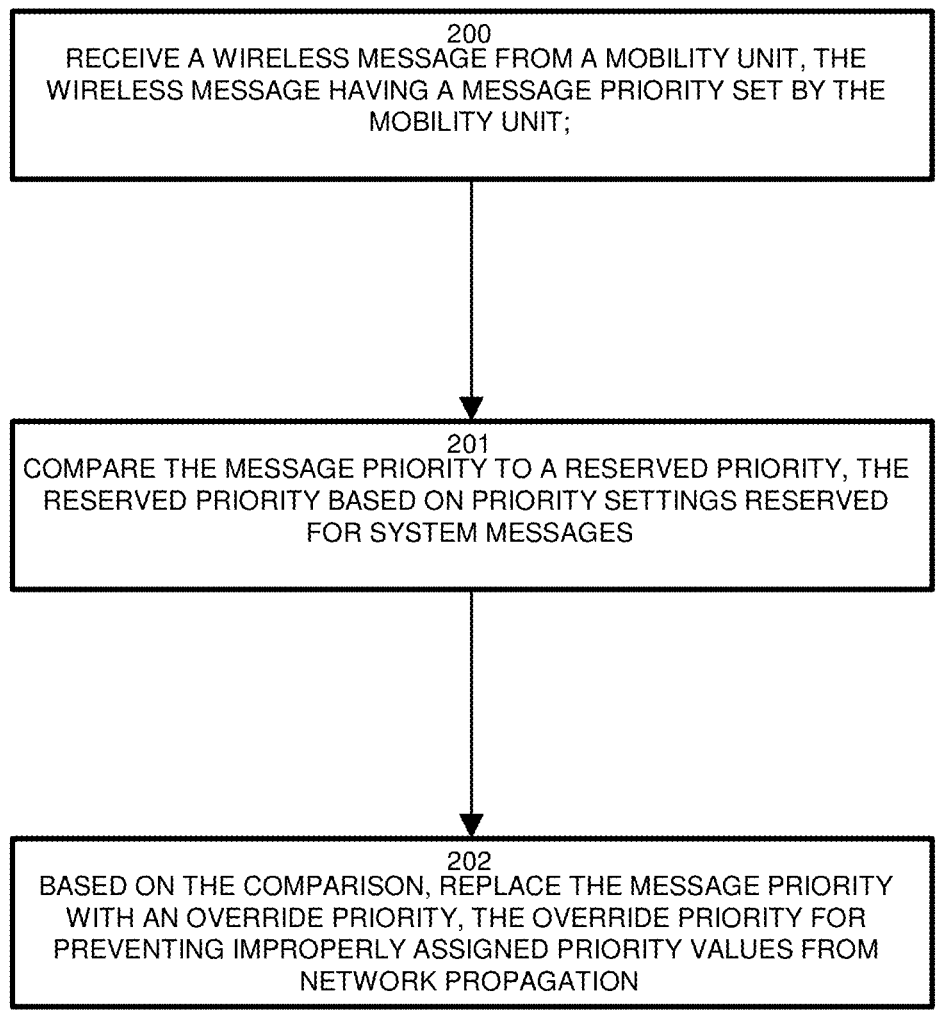
FIG. 2 is a flowchart of setting message priority as disclosed herein.

FIG. 2 is a flowchart of setting message priority as disclosed herein. Referring to FIGS. 1 and 2, the method for wireless message transport as disclosed herein includes, at step 200 receiving a wireless message 116 from a mobility unit 110, in which the wireless message 116 has a message priority set by the mobility unit 110. A receiving access point 120 compares the message priority 152 to a reserved priority, such that the reserved priority is based on priority settings reserved for system messages, as depicted at step 201. Based on the comparison, the access point 120 replaces the message priority 152 with an override priority, such that the override priority is for preventing improperly assigned priority values from network propagation, as depicted at step 202.

Figure 3:
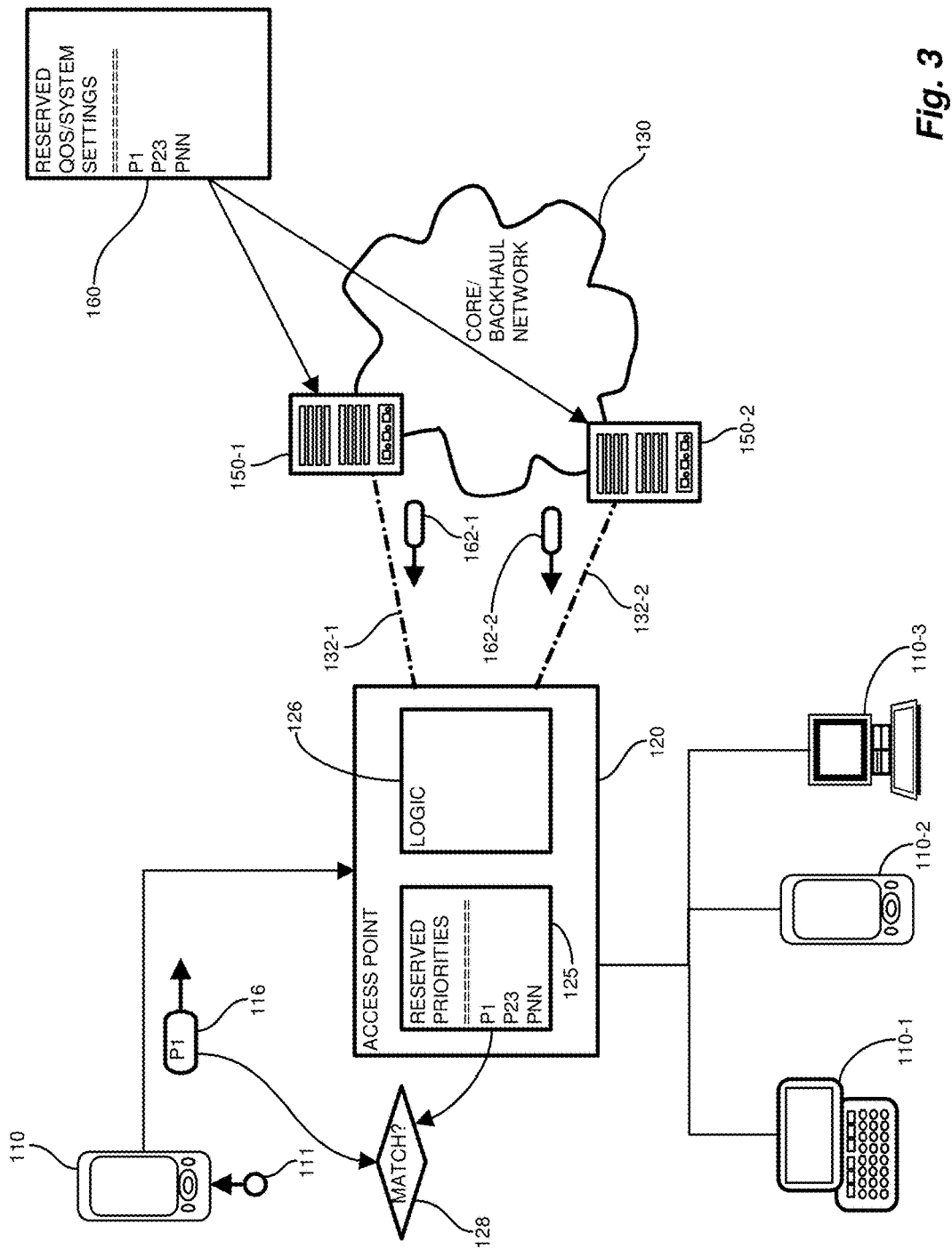
FIG. 3 is a block diagram of message priority determination in the environment of FIG. 1

FIG. 3 is a block diagram of message priority determination in the environment of FIG. 1. Referring to FIGS. 1 and 3, the mobility device 110 sends a message 116 having priority P1. Generally, the access point 120 also serves a plurality of mobility devices 110-1 . . . 110-3 for providing wireless (e.g. WiFi) connectivity. In the example configuration, the access point 120 maintains a priority table 125 of reserved priorities which should not be set by any mobility applications 111 executing on the mobility devices 110. The wireless switching points 150-1, 150-2 (150 generally) receive and store a QoS reserved list 160 or set of system reserved priority values. According to configurations herein, each wireless switching point 150 sends a reserved priority message 162-1, 162-2 (162 generally) indicative of QoS values that are reserved, or disallowed, on the particular access tunnel 132-1, 132-2 respectively, concerned. The access point 120 maintains the table 125 corresponding to the access tunnel 132 through which it maintains a connection to the wireless switching point 150. The incoming message 116 is examined by access point logic 126 for priority values matching the table 125, and if a match 128 occurs (i.e. the mobility app 110 improperly applied a heightened priority value), the access point overwrites the priority with the default (low) priority. In this manner, the message 116 will not be transmitted through the access tunnel 132 at the elevated priority since the access point 120 had the ability to identify reserved priority values prior to sending the message 116 through the tunnel 132.

In the event that the access tunnel 132-1 serving the access point 120 is changed, due to failover or performance, a new access tunnel 132-2 becomes established to provide connectivity to the core 130. Upon establishment, the new wireless switching point 150-2 sends the priority message 162-2 indicative of the reserved priority values stored at the new wireless switching point 150-2. Upon receipt, the access point 120 updates the table 125 with the new priority message 162-2 and applies the values to scrutinize messages 116 sent through the new access tunnel 132-2.

Figure 4:
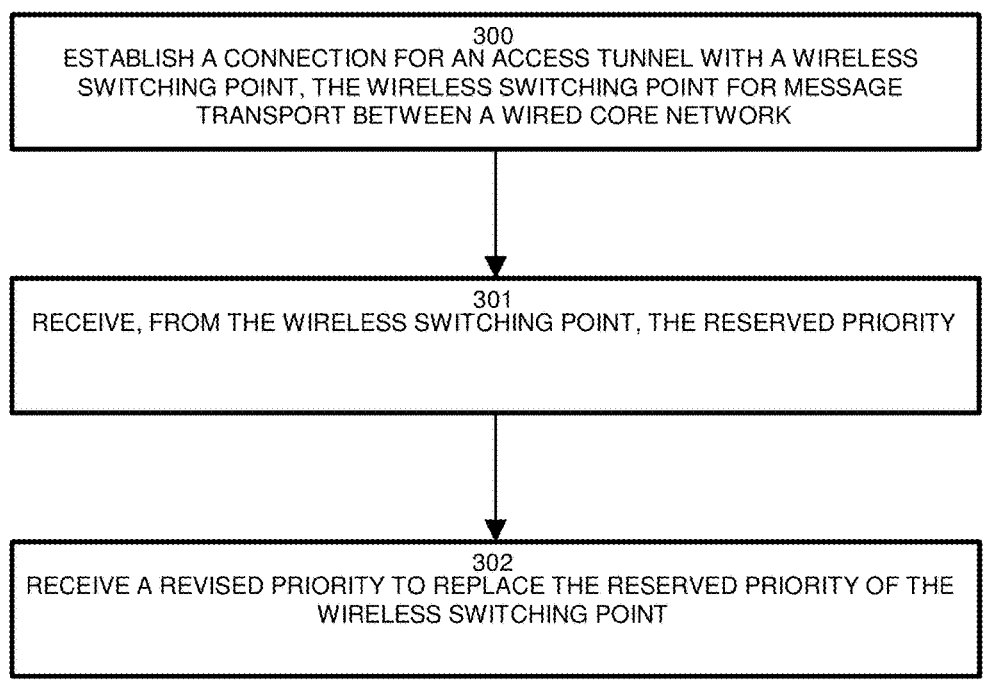
FIG. 4 is a flowchart of processing the reserved priority as in FIG. 3.

FIG. 4 is a flowchart of processing the reserved priority as in FIG. 3. Referring to FIGS. 1 and 3-5, at step 300, the access point 120 establishes a connection 122 for an access tunnel 132 with a wireless switching point 150, in which the wireless switching point 150 is for message transport between a wired core network 130. The access point 120 receives, from the wireless switching point 150, the reserved priority values 162 for comparison with mobility message traffic, as disclosed at step 301.

In the example shown, the access tunnel 132 corresponds to an interface at the wireless switching point 150 for communicating with the access point 120. For example, the access tunnel may incorporate a VLAN (Virtual Local Area Network) between the access point 120 and the wireless switching point 150. In the course of network operations, it may be necessary or beneficial to move tunnel to WSP 150-2. The reason for tunnel movement could be, for example, data-path failure between AP and 150-1 resulting in AP moving over to 150-2, administrator initiated action forcing AP to move to 150-2 or failure of 150-1 resulting in AP movement. These can be driven from WSP or from a control connection between AP and a wireless controller (WC) or if AP provides the facility a configuration change on AP can also drive this movement. If so, the access point 120 identifies the new access tunnel 132-2 endpoint at the second switching point 150-2, and receives a revised priority to replace the reserved priority of the wireless switching point 150-2, as depicted at step 302.

Figure 5:
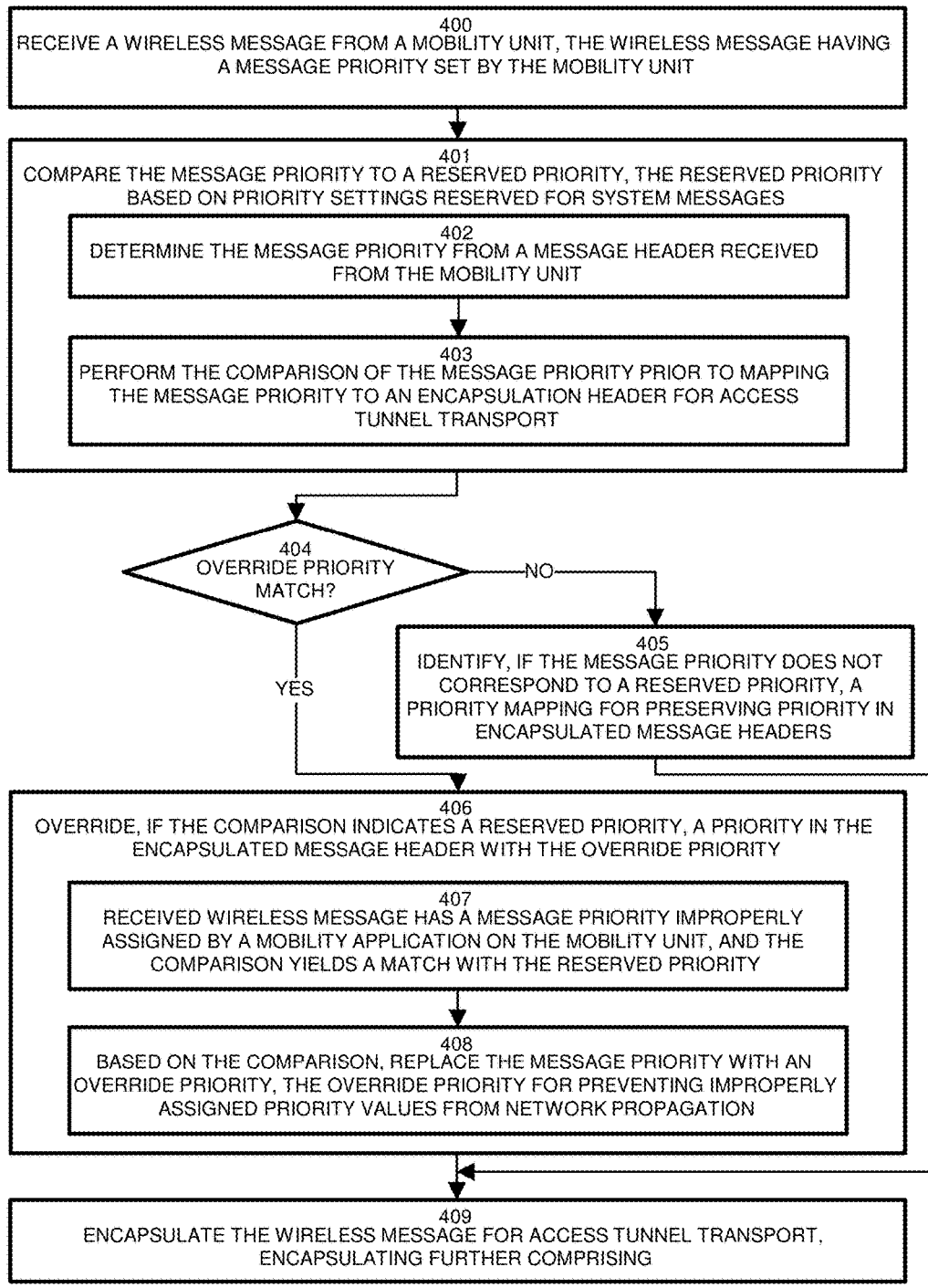
FIG. 5 is a flowchart in greater detail of the priority determination of FIG. 3.

FIG. 5 is a flowchart in greater detail of the priority determination of FIG. 3. Referring to FIGS. 3 and 5, at step 400, the access point 120 receives a wireless message 116 from the mobility unit 110, such that the wireless message has a message priority 152 set by the mobility unit 110. The priority 152, typically being set or written from an app 111 running on the device 110, may not be sufficiently trusted or validated due to the lack of control over such apps 111. In either case, due to initial access tunnel invocation or a shift to the new wireless switching point 150-2, the access point 120 compares the message priority in the received message 116 to a reserved priority 125, such that the reserved priority 125 is based on priority settings 160 reserved for system messages, as depicted at step 401. This includes determining the message priority from a message header received from the mobility unit 110, as shown at step 402, and performing the comparison of the message priority prior to mapping the message priority to an encapsulation header for access tunnel 132 transport, as shown at step 403, otherwise an improper priority would be employed for transport via the access tunnel 132.

A check is performed, at step 404, to determine if the message priority set by the mobility device 110 matches any of the reserved priority values in the table 125 by comparing the message priority of the received message 116 at the wireless access point 120 prior to invoking the access tunnel 132 for transport to a wireless switching point 150.

If the message priority does not correspond to a reserved priority, then the access tunnel 132 performs a priority mapping for preserving priority in encapsulated message headers, as shown at step 405, thus "trusting" the priority or QoS value set by the mobility device 110 and allowing the priority to propagate to the outer encapsulation for treatment in the access tunnel 132.

In contrast, in the case of an improper priority value, then the access point overrides, if the comparison indicates a reserved priority, the priority 152 in the encapsulated message header with the override priority, typically a lower value such as best effort, as disclosed at step 406. In the example configuration, the received wireless message 116 has a message priority improperly assigned by a mobility application 111 on the mobility unit 110, and the comparison yields a match with the reserved priority from the table 125, as depicted at step 407. Based on the comparison, the access point 120 replaces the message priority 152 with an override priority, such that the override priority is for preventing improperly assigned priority values from network propagation, as disclosed at step 408. In the example shown, the encapsulation header is at least one of a layer 2 (L2) Ethernet header or a layer 3 (L3) IP header, such that the L2 header has at least 3 priority bits identifying 8 priority levels, and the L3 header having 64 priority levels defined by a protocol. Alternate arrangement and value schemes may be employed in other implementations. Typically, the message priority 152 corresponds to a Quality of Service (QoS) designation of the wireless message 116, such that the QoS designation is based on a type of payload in the message, in which the QoS designations favor system messages between switching entities over user traffic. Such system messages occupy a priority above even voice traffic of user messages, typically a higher priority due to the real time nature of the exchange.

Once the proper priority is determined, either by override at step 406 or normal propagation at step 405, the access point 120 encapsulates the wireless message 118 for access tunnel 132 transport, as depicted at step 409.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:
1. A method for wireless message transport comprising:
   receiving a wireless message from a mobility unit running an application that created the message, the wireless message having a message priority set by the mobility unit;
   comparing the message priority to reserved priorities found in a reserved priority list, wherein the reserved priorities are based on priority settings reserved for system messages and the comparing is performed independently of an identity of the application that created the message; and based on the comparison, replacing the message priority with an override priority, the override priority for preventing improperly assigned priority values from network propagation, wherein the received wireless message has a message priority improperly assigned by a mobility application on the mobility unit, and the comparison yields a match with the reserved priority, and wherein the message priority corresponds to a Quality of Service (QoS) designation of the wireless message, the QoS designation based on a type of payload in the message, the QoS designations favoring system messages between switching entities over user traffic.

2. The method of claim 1 further comprising:
establishing a connection for an access tunnel with a wireless switching point, the wireless switching point for message transport between a wired core network; and
receiving, from the wireless switching point, the reserved priorities for the reserved priority list.

3. The method of claim 2 wherein the access tunnel corresponds to an interface at the wireless switching point, further comprising:
determining when an endpoint of the access tunnel changes from the wireless switching point;
identifying a new access tunnel endpoint at a second switching point; and
receiving revised priorities to replace the reserved priorities of the wireless switching point.

4. The method of claim 3 further comprising encapsulating the wireless message for access tunnel transport, encapsulating further comprising:
determining the message priority from a message header received from the mobility unit; and
performing the comparison of the message priority prior to mapping the message priority to an encapsulation header for access tunnel transport.

5. The method of claim 4 further comprising:
identifying, if the message priority does not correspond to a reserved priority of the reserved priority list, a priority mapping for preserving priority in encapsulated message headers; and
overriding, if the comparison indicates a reserved priority, a priority in the encapsulated message header with the override priority.

6. The method of claim 5 wherein the encapsulation header is at least one of a layer 2 (L2) Ethernet header or a layer 3 (L3) IP header, the L2 header having at least 3 priority bits identifying 8 priority levels, the L3 header having 64 priority levels defined by a protocol.

7. The method of claim 1 further comprising:
establishing, from a wireless access point, an access tunnel to the wireless switching point;
receiving, from the wireless access point, the reserved priority corresponding to the access tunnel, the priority based on QoS (Quality of Service) specifiers; and
comparing the message priority of the received message at the wireless access point prior to invoking the access tunnel for transport to a wireless switching point.

8. A wireless access device comprising:
wireless interface hardware configured to receive a wireless message from a mobility unit running an application that created the message, the wireless message having a message priority set by the mobility unit;

a priority table for comparing the message priority to reserved priorities found in a reserved priority list, wherein the reserved priorities are based on priority settings reserved for system messages and the comparing is performed independently of an identity of the application that created the message; and access point logic for, based on the comparison, replacing the message priority with an override priority, the override priority for preventing improperly assigned priority values from network propagation, wherein the received wireless message has a message priority improperly assigned by a mobility application on the mobility unit, and the comparison yields a match with the reserved priority, and wherein the message priority corresponds to a Quality of Service (QoS) designation of the wireless message, the QoS designation based on a type of payload in the message, the QoS designations favoring system messages between switching entities over user traffic.

9. The device of claim 8 wherein the access point logic is further configured for:
establishing a connection for an access tunnel with a wireless switching point, the wireless switching point for message transport between a wired core network; and
receiving, from the wireless switching point, the reserved priorities for the reserved priority list.

10. The device of claim 9 wherein the access tunnel corresponds to an interface at the wireless switching point, the wireless switching point configured for:
determining when an endpoint of the access tunnel changes from the wireless switching point;
identifying a new access tunnel endpoint at a second switching point; and
receiving revised priorities to replace the reserved priorities of the wireless switching point.

11. The device of claim 10 wherein the access point logic is operable to encapsulate the wireless message for access tunnel transport, encapsulating including:
determining the message priority from a message header received from the mobility unit; and
performing the comparison of the message priority prior to mapping the message priority to an encapsulation header for access tunnel transport.

12. The device of claim 11 wherein the access point logic is further configured to:
identify, if the message priority does not correspond to a reserved priority of the reserved priority list, a priority mapping for preserving priority in encapsulated message headers; and
override, if the comparison indicates a reserved priority, a priority in the encapsulated message header with the override priority.

13. The device of claim 12 wherein the encapsulation header is at least one of a layer 2 (L2) Ethernet header or a layer 3 (L3) IP header, the L2 header having at least 3 priority bits identifying 8 priority levels, the L3 header having 64 priority levels defined by a protocol.

14. The device of claim 8 wherein the access point logic is further configured to:
establish, from a wireless access point, an access tunnel to the wireless switching point;
receive, from the wireless access point, the reserved priority corresponding to the access tunnel, the priority based on QoS (Quality of Service) specifiers; and compare the message priority of the received message at the wireless access point prior to invoking the access tunnel for transport to a wireless switching point.

15. A computer program having a set of instructions stored on a non-transitory computer readable storage medium that, when executed by a processor, perform a method for wireless message transport comprising:

receiving a wireless message from a mobility unit running an application that created the message, the wireless message having a message priority set by the mobility unit;

comparing the message priority to reserved priorities found in a reserved priority list, wherein the reserved priorities are based on priority settings reserved for system messages and the comparing is performed independently of an identity of the application that created the message; and based on the comparison, replacing the message priority with an override priority, the override priority for preventing improperly assigned priority values from network propagation, wherein the received wireless message has a message priority improperly assigned by a mobility application on the mobility unit, and the comparison yields a match with the reserved priority, and wherein the message priority corresponds to a Quality of Service (QoS) designation of the wireless message, the QoS designation based on a type of payload in the message, the QoS designations favoring system messages between switching entities over user traffic.

16. The method of claim 1 wherein system messages acquire higher priority over user traffic messages due to a real time nature of the system messages.

17. The wireless access device of claim 8 wherein system messages acquire higher priority over user traffic messages due to a real time nature of the system messages.

18. The computer program of claim 15 wherein system messages acquire higher priority over user traffic messages due to a real time nature of the system messages.

* * * * *